(12) United States Patent
Guerra (10) Patent No.: US 11,570,947 B2
(45) Date of Patent: Feb. 7, 2023

(54) ROTARY HEAD FOR STRING TRIMMER (71) Applicant: FLASHCUTTER S.R.L. CON UNICO SOCIO, Correggio (IT)

(72) Inventor: Lauro Guerra, Correggio (IT)

(73) Assignee: FLASHCUTTER S.R.L. CON UNICO SOCIO, Correggio (IT)

( * ) Notice: Subject to any disclaimer, the term of this patent is extended or adjusted under 35 U.S.C. 154(b) by 231 days.

(21) Appl. No.: 16/909,219

(22) Filed: Jun. 23, 2020

(65) Prior Publication Data

US 2020/0404839 A1    Dec. 31, 2020

(30) Foreign Application Priority Data

Jun. 25, 2019   (IT) .................... 102019000010002

(51) Int. Cl.
*A01D 34/416*   (2006.01)
(52) U.S. Cl.
CPC ............................... *A01D 34/4166* (2013.01)
(58) Field of Classification Search
CPC ............ A01D 34/4166; A01D 34/416
See application file for complete search history.

(56) References Cited

U.S. PATENT DOCUMENTS

| | | |
|---|---|---|
| 5,979,064 A | 11/1999 | Kitz et al. |
| 6,487,780 B1 | 12/2002 | Peterson et al. |
| 6,519,857 B1 | 2/2003 | Proulx et al. |
| 6,986,239 B1* | 1/2006 | Compton ............. A01D 34/736 56/17.5 |
| 2002/0073556 A1* | 6/2002 | Fogle ................... A01D 34/416 30/276 |
| 2006/0005520 A1 | 1/2006 | Weidman |
| 2016/0029556 A1* | 2/2016 | Legrand ............. A01D 34/4168 30/276 |
| 2020/0045881 A1* | 2/2020 | Cigarini ............. A01D 34/4165 |
| 2020/0404839 A1* | 12/2020 | Guerra ................ A01D 34/416 |
| 2021/0321561 A1* | 10/2021 | Ruppel .............. A01D 34/4163 |
| 2022/0039315 A1* | 2/2022 | Gay .................. A01D 34/4166 |

FOREIGN PATENT DOCUMENTS

| | | | |
|---|---|---|---|
| EP | 0903071 A1 | | 3/1999 |
| EP | 2 692 221 A1 | * | 2/2014 |
| EP | 3 756 439 A1 | * | 12/2020 |
| WO | WO9818312 A1 | | 5/1998 |

OTHER PUBLICATIONS

Italian Search Report and Written Opinion issued by Ministero dello Sviluppo Economico for Italian Application No. 102019000010002, dated Feb. 20, 2020, pp. 1-7.

* cited by examiner

*Primary Examiner* — Hwei-Siu C Payer
(74) *Attorney, Agent, or Firm* — The Belles Group, P.C.

(57) ABSTRACT

A rotary head for string trimmers having a rotary body with a rotation axis and manufactured as one single piece; wherein the rotary body has one or more return areas, each of which is configured to lock a respective line portion by means of consecutive curves on different planes.

10 Claims, 8 Drawing Sheets

ROTARY HEAD FOR STRING TRIMMER

CROSS-REFERENCE TO RELATED APPLICATIONS

This patent application claims priority from Italian patent application no. 102019000010002 filed on Jun. 25, 2019, the entire disclosure of which is incorporated herein by reference.

TECHNICAL FIELD

The present invention relates to a rotary head for string trimmers.

BACKGROUND OF THE INVENTION

As is known, there are different categories of rotary heads for string trimmers.

According to a first category of rotary heads, the use is comprised of one of more reels of cutting line made of a plastic material. In this case, once a portion of cutting line is worn, it is possible to extract a new portion of line from the reel and continue the cutting by means of somewhat complicated maneuvers.

Whereas, a second category of rotary head comprises the use of single portions of line fastened to the central body according to various types:

a) The lines are locked by twisty paths created inside the rotary body. Such paths are created so that it is easy to insert the lines, but less easy to remove them afterwards. According to this type of solution, on working, the line is deformed and no longer slides as on insertion. The size of the passages is calibrated as a function of the diameter of the line. This results in the disadvantage of having to comprise a rotary head for each category of line. For example, to cover the range of lines normally present on the market having a diameter ranging from 2 to 4.5 mm, it is currently necessary to use three different types of heads. This is because lines having a small diameter unthread, if they are inserted in twisty paths with large holes; on the contrary, lines having a large diameter are unable to slide and therefore be inserted inside twisty paths with a small diameter.

b) The lines are inserted into one or more straight holes (crosswise to the rotation axis) with large diameters (i.e. larger than the diameters of the lines normally used), which cross the rotary head.

In this case, the lines are locked inside the respective holes by means of screws. Disadvantageously, in this type of solution, a clearance is always comprised between the line and the hole, however, this causes greater wear of the line, which, at the outlet of the rotary head, knocks against the outlet edge. Furthermore, for this type of solutions, it is always necessary to have a key afterwards for (loosening-tightening) the locking screw and allowing the worn line to be replaced with a new one.

c) The lines are locked between two threaded pieces of the rotary head, which are tightened manually.

Disadvantageously, in this type of solution, the two threaded pieces can become locked with the vibrations. Therefore, in order to loosen the two pieces, it is necessary to have a key and a rod (for inserting inside the special seats with which the rotary head is provided).

All of the types a), b), c) described above are further slowed down during the changing of the line, when the portions of line break, close to the outer diameter of the rotary head. In fact, in this case, there is no witness, i.e. an edge, to remove them.

Furthermore, according to type b) the lines deform in the point where they are pressed to lock them, inside the holes.

A third category comprises a series of air knives made of a plastic material and hinged to a central hub.

In particular, the present invention relates to the second category, in particular, to type a) described above, to improve the numerous drawbacks thereof.

In particular, the technical problem aimed to be solved due to the present invention consists of creating a rotary head for string trimmer, of the type having portions of cutting line, for which it is easy to replace (insert-remove) a portion of line, once it is worn, with a new one without the aid of any tools.

SUMMARY OF THE INVENTION

Therefore, according to the present invention, a rotary head for string trimmer is made according to what is claimed in claim 1, or in any one of the claims depending, directly or indirectly, on claim 1.

BRIEF DESCRIPTION OF THE DRAWINGS

For a better understanding of the present invention, a few embodiments are now described, purely by way of non-limiting examples and with reference to the attached drawings, wherein.

DETAILED DESCRIPTION OF THE INVENTION

Figure 1:
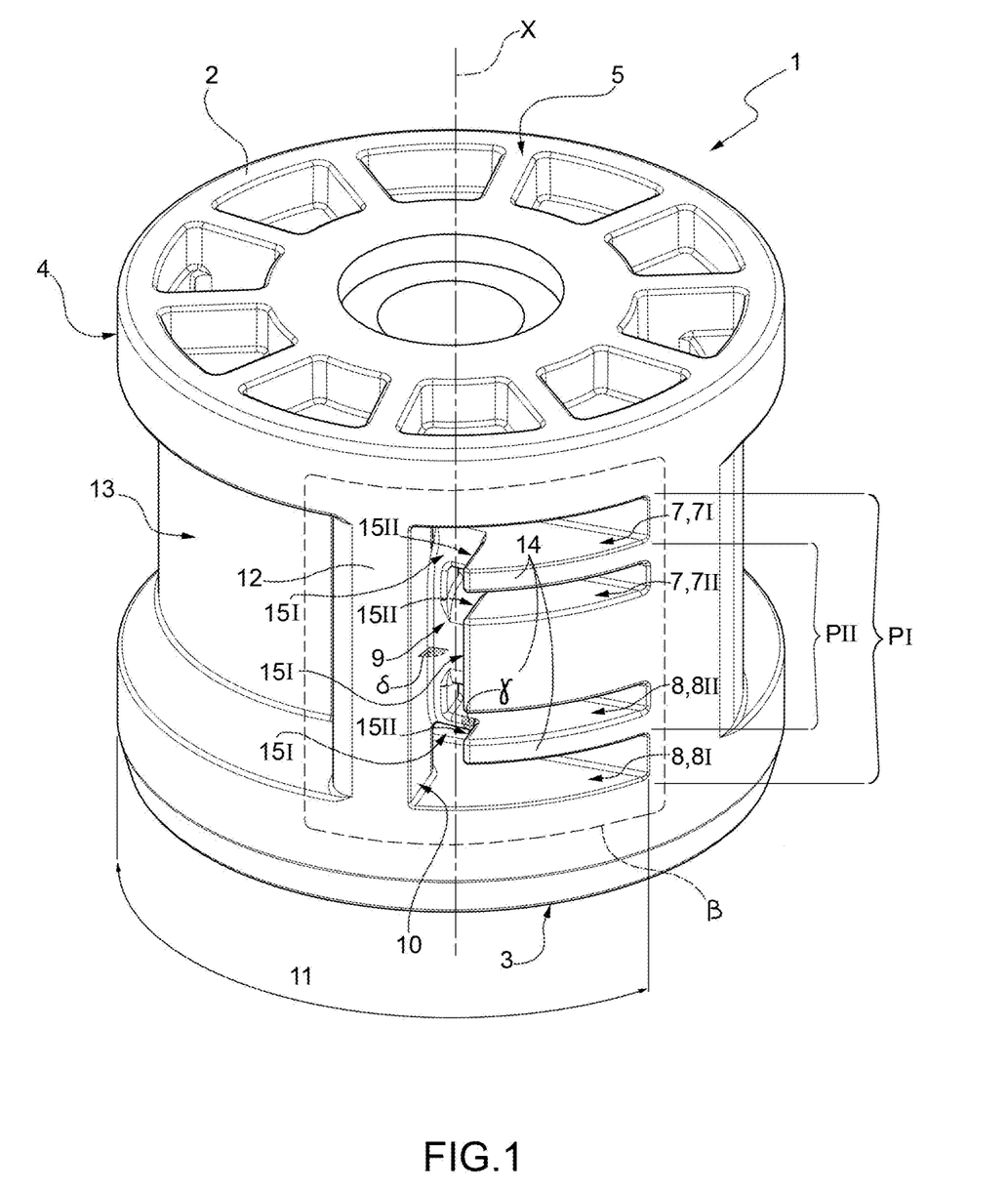
FIG. 1 depicts a perspective view of a first embodiment of a rotary head for string trimmer made according to the teachings of the present invention.

In FIG. 1, a rotary head 1 for string trimmer according to the present invention is globally denoted with 1. The rotary head 1 comprises a rotary body 2 made in a single piece. The rotary body 2 has a longitudinal rotation axis X. The rotary body 2 has a base 3, a side wall 4 and an upper wall 5.

Figure 4:
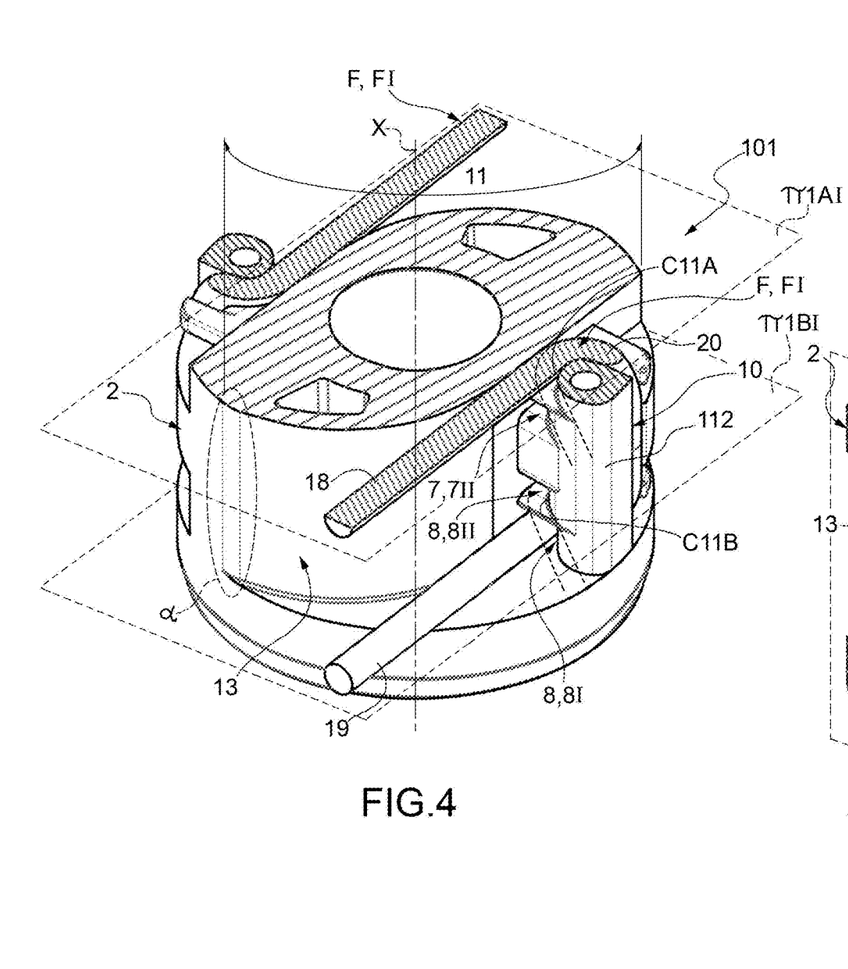
FIG. 4 is a section according to the plane $\pi 4$ in FIG. 2.

The rotary body 2 has one or more return areas β, each of which is configured to accommodate a respective portion of line F (depicted in FIGS. 4 to 6) and cause a plurality of consecutive curves C of said line F.

As depicted in FIG. 1, the rotary head 1 has a plurality of paths P at each return area β. According to the depicted example, the paths are two in number: PI and PII. Each path P is configured to keep the portion of line F locked.

Advantageously, path PI is configured to accommodate lines having a medium to maximum section, i.e. about 3 to 5 mm.

Advantageously, path PII is configured to accommodate lines having a medium to small section, i.e. from 1.5 to 3 mm.

Each path P has a pair of channels, identified here below as upper channel 7 and lower channel 8, crosswise to the rotation axis X and to a groove 9 substantially parallel to the rotation axis X and which connects the upper channel 7 and the lower channel 8 to each other at respective ends. In other words, the upper channel 7 and the lower channel 8 are parallel to each other and have ends aligned along an axis substantially parallel to the rotation axis X.

In the figures, the upper channels 7 and the lower channels 8 are marked with the suffix I or II for path PI and PII respectively.

In particular, as depicted in FIG. 1, the rotary head 1 has an outer path PI and an inner path PII. The inner path PII is substantially made inside the outer path PI. According to the example depicted in the figures, the outer path PI and the inner path PII share one same groove 9. In this case, the upper channel 7II and the lower channel 8II of the inner path PII are interposed along the groove 9 between the upper channel 7I and the lower channel 8I of the outer path PI.

Advantageously, as will be illustrated in further detail below, at the return area β the rotary head 1 has a return portion 12 configured to obtain a plurality of curves C on the line F. In particular, the rotary head 1 has a plurality of curvature portions R at the return portion 12.

Advantageously, by means of the specific sequence of curvature portions R of the return portion 12, it is possible to obtain the locking of the line F.

According to a variant, which is not shown, the rotary body 2 can have a different arrangement from the paths P, for example, it could have two or more paths set longitudinally side by side between one another, i.e. it could have an upper path and a lower path, wherein the upper channel and the lower channel of the upper path are arranged, in use, above, with respect to the rotation axis X of the upper channel and the lower channel of the lower path.

Figure 2:
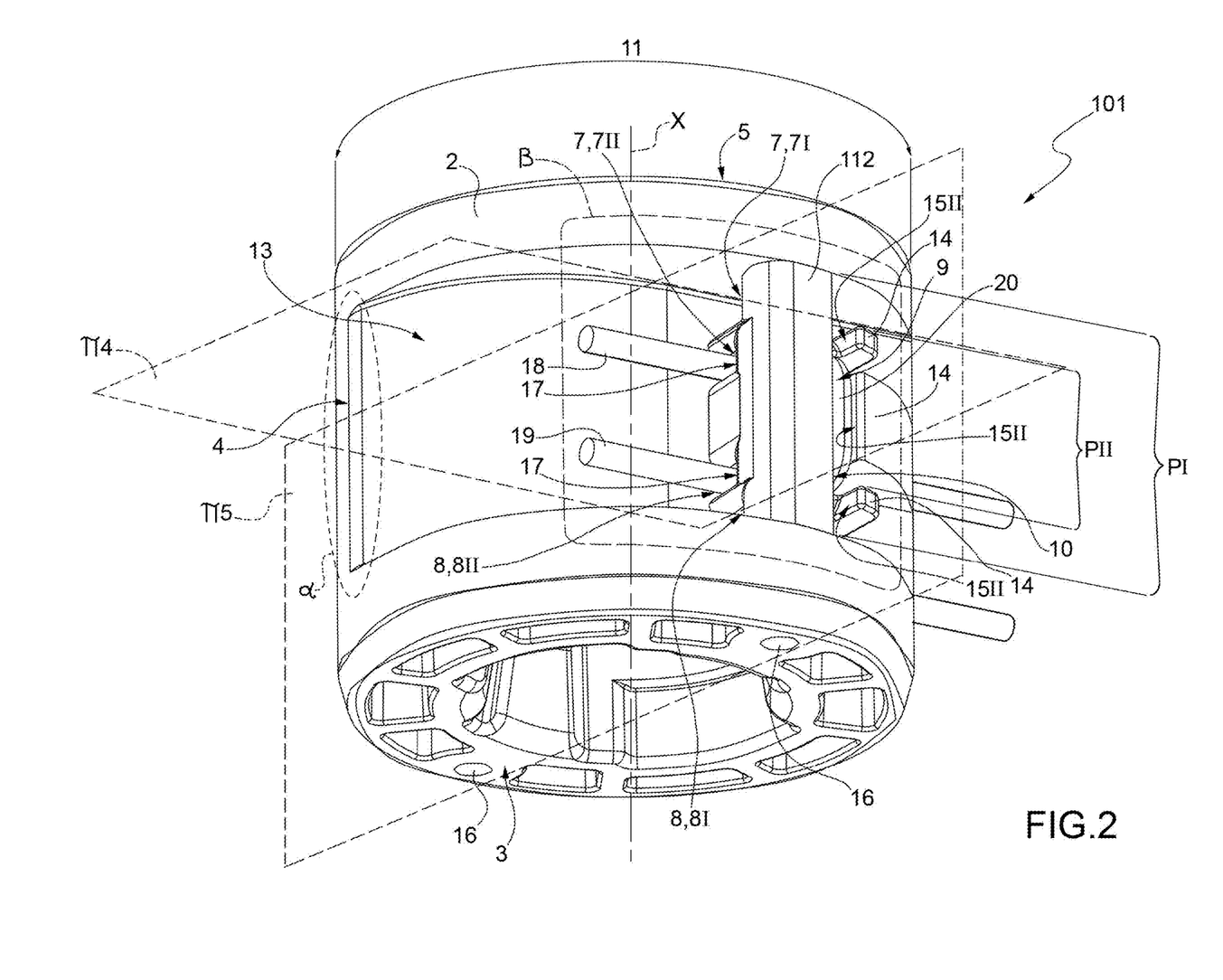
FIG. 2 is similar to FIG. 1 and depicts a variant of the rotary head according to the present invention.

According to the example depicted in FIGS. 1 and 2, the rotary had. 1 has a recess 11 obtained on the side wall 4 of the rotary body 2. The recess 11 communicates radially with the outside of the rotary body 2. The return portion 12 is arranged inside the recess 11 and delimits, with the recess 11, the upper channels 7, the lower channels 8 and the groove 9. According to the embodiment depicted in FIG. 1, the return portion 12 has been obtained in the rotary body 2.

The recess 11 is radially delimited by a bottom surface 13 and has a depth, which varies from an area of attack α (visible in FIGS. 2 to 6) to at least the return area β. At the return area β, the recess 11 has a depth, which is substantially equal to, or greater than the radial extension of the return portion 12. According to the embodiment illustrated in FIG. 1, the recess 11 is through, i.e. the bottom surface 13 is substantially flat at the return area β, to subsequently connect to the outer diameter of the rotary head 1 in point α.

According to the illustration in FIG. 1, the rotary body 2 comprises boards 14, which are substantially crosswise to the rotation axis X and which extend inside the recess 11 towards the return portion 12 so as to laterally delimit the upper channels 7 and the lower channels 8. Advantageously, the boards 14 radially delimit the upper channels 7 and the lower channels 8.

The return portion 12 is interposed along the circumference of the rotary head 1 between: the boards 14 and the area of attack α.

Each board 14 is radially delimited by a radial striking surface 15I. The radial striking surface 15I is substantially Parallel to the bottom surface 13.

Each board 14 is laterally delimited by a side striking surface 15II. Preferably, the radial striking surface 15I protrudes outwards from the bottom surface 13.

The radial striking surface 15I is curved, i.e. it is substantially parallel to the bottom surface 13 at a central zone and it is degrading, i.e. it reduces the distance with the bottom surface 13, both towards the base 3 and towards the upper wall 5.

Preferably, each side striking surface 15II is inclined, so as to form an angle γ, which is equal to, or smaller than 90°, with the radial striking surface 15I.

The return portion 12 has a side surface 10, which is facing, in use, the side striking surface 15II of each board 14.

The groove 9 is delimited by the side surface 10 by the radial striking surface 15I and by the side striking surface 15II.

The side surface 10 forms an angle δ with the radial striking surface 15I. The angle δ is equal to, or smaller than 90°. The side surface 10 is substantially parallel to the side striking surface 15II.

Advantageously, the lateral distance between each side striking surface 15II and the side surface 10 of the return portion 12 is greater than the maximum thickness of the mountable line portion F.

The depth, i.e. the radial extension, of the groove 9 is configured to accommodate up to the maximum section of the line it can accommodate, so that, in use, the line doesn't protrude beyond the diameter of the rotary head 1.

Advantageously, the line F is retained inside paths PI, PII by means of successive curves C obtained on different planes, in particular, which are transversal to one another, as will be shown better below.

Figure 3:
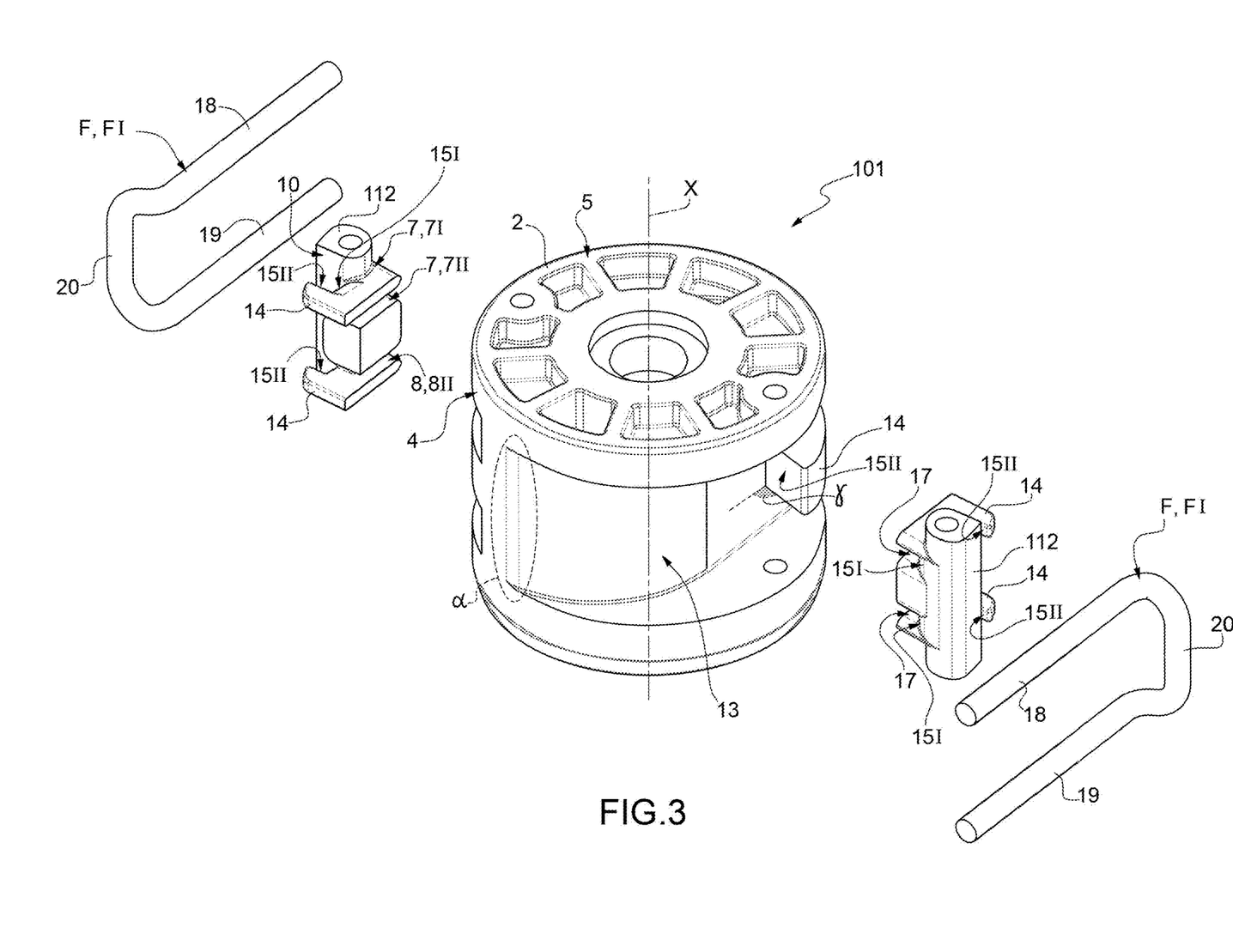
FIG. 3 is an exploded view of FIG. 2.

A variant of the rotary head according to the present invention is denoted with 101 in FIGS. 2 and 3. The rotary head 101 substantially comprises all of the components of the rotary head 1 described above. Below, and in FIGS. 2 to 6, the components in common keep the same numbering and are not repeated for brevity. According to the illustrated variant, in. FIGS. 2 to 6, the rotary head 101 comprises a return unit 112 instead of the return portion 12 described above, which is made in a separate piece from the body of the rotary head 101. The return unit 112 is connected to the rotary body 2 by releasable means, for example, by a pin 16.

According to the variant depicted in FIGS. 2 and 3, the return unit 112 has recesses 17, which laterally delimit, together with the bottom surface 13, the upper channels 7 and the lower channels 8.

According to the variant depicted in FIGS. 2 and 3, in order to delimit the upper channels 7 and the lower channels 8 inside the recess 11, the boards 14 are partly obtained in the rotary body 2 and partly in the return unit 112. In particular, as is visible in FIG. 3, one central board 14 protrudes from the rotary body and two lateral boards 14 protrude from the return unit 112.

Preferably, the rotary head 1 or 101 is made of a polymer material. Alternatively, the rotary head 1 or 101 can be made of a metal material.

According to a variant, which is not, illustrated, the rotary head 1 or 101 can have a different number of paths PI or PII. For example, the rotary head 1 or 101 can have a single path P.

The portion of line F inserted in the rotary head 1 or 101 is bent, in use, about the return portion 12 or the return unit 112 and has an upper portion 18 and a lower portion 19, which protrude from the rotary head and which are connected to each other by a connection portion 20.

In the rotary head 1 or 101, the upper channel 7, the lower channel 8 and the groove 9 are configured so as to create a succession of curves C on different planes, which will be shown better below.

Figure 6:
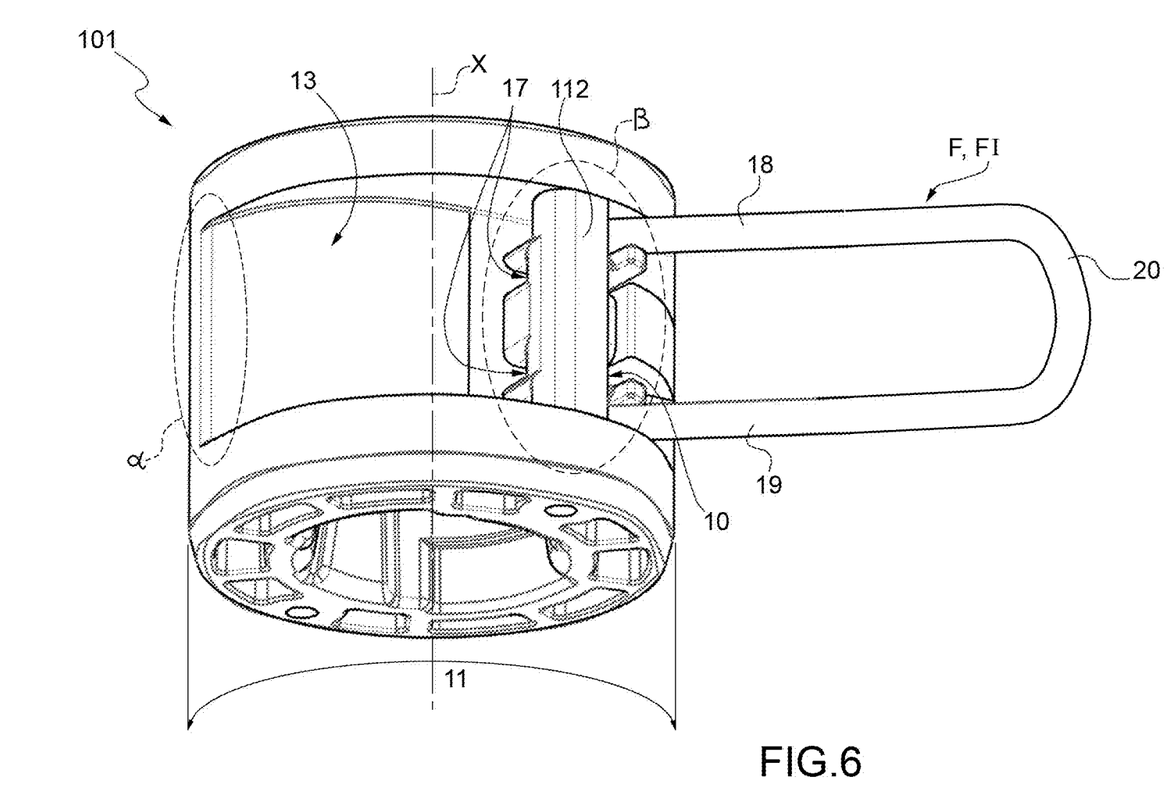
FIG. 6 is a schematic and perspective view of the rotary head in FIG. 3 during the insertion of a line.

As shown in the example in FIG. 6, the upper portion 18 is inserted inside the upper channel 7,7I, the lower portion 19 is inserted inside the lower channel 8, 8I and the connection portion 20 is inserted inside the respective groove 9. In this way, the portion of line F is bent forming a plurality of successive curves C on planes π1A, π1B, π2, which are different from one another, so as to be fastened to the rotary head 1 or 101. According to the illustrated example, planes π1A and π1B are parallel to one another. Planes π1A and π1B are perpendicular to the longitudinal axis X. Plane π2 is radial and coplanar to the longitudinal axis X. Planes π1A and π1B are substantially perpendicular to plane π2.

At the passage straddling the upper channel 7 and the groove 9, the line F forms a curve C1A on plane π1A and a curve C2A on plane π2.

At the passage from the groove 9 to the lower channel 8, the line forms a curve C1B on plane π1B and a curve C2B on plane π2.

The curvature radii of the curves C1A, C2A, C1B and C2B described above are configured to prevent the line F from sliding during use of the rotary head 1.

Advantageously, the consecutiveness between the curves C1A and C2A and the consecutiveness between the curves C1B and C2B prevents the portions 18 and 19 from unthreading.

Advantageously, a further curve C11A of the line is comprised on plane π1A, which is created in use exiting the return portion 12 or the return unit 112. According to the example shown in FIG. 4, the upper portion 18 and the lower portion 19 can oscillate on plane π1A from a position, in which they are substantially flattened against the bottom surface 13, to a position, in which they are partially bent on the return portion 12 or the return unit 112.

When the upper portion 18 is partially bent on the return portion 12 or the return unit 112 it forms a curve C11A on plane π1A.

When the lower portion 19 is partially bent on the return portion 12 or return unit 112, it forms a curve C11B on plane π1B.

Figure 7:
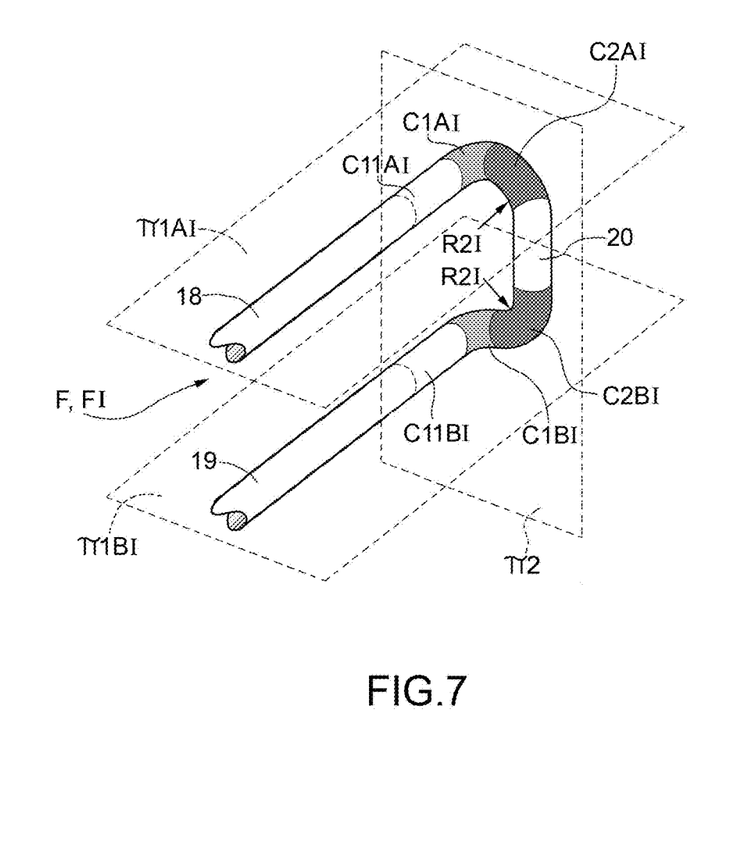
FIG. 7 schematically depicts how a portion of line is bent along a first path of a rotary head according to the present invention.
Figure 8:
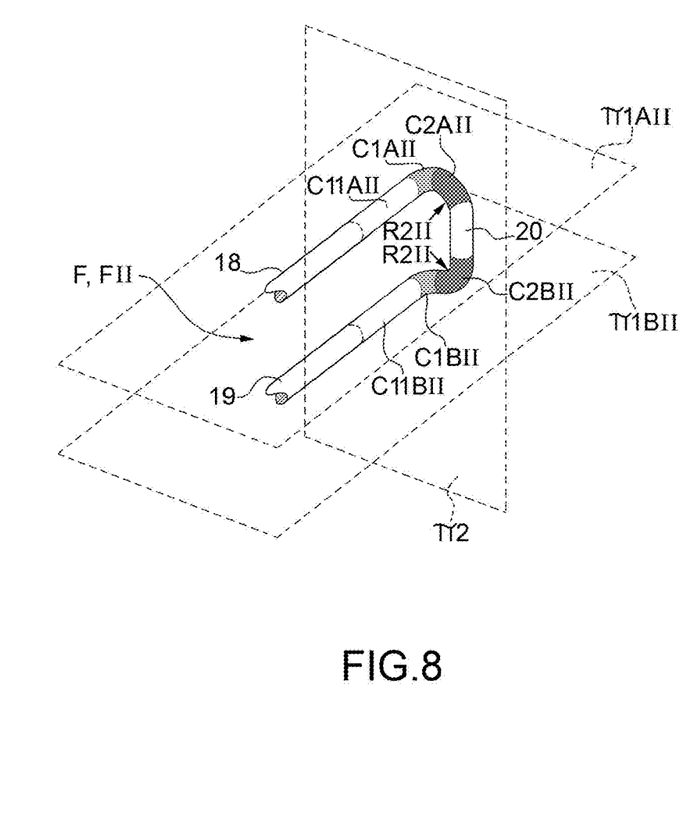
FIG. 8 schematically depicts how a portion of line is bent along a second path of a rotary head according to the present invention.

Advantageously, the curves C11A and C11B, which are formed, have radii, which are such as to prevent the breaking of the line portion F. The curvature radii of the curves C1A, C2A, C1B and C2B, described above, are different, depending on the type of path PI or PII used. The curves C1A, C2A, C1B and C2B, which the portion of line F makes along path PI and PII inside the rotary head 1 or 101 respectively, are schematised in FIGS. 7 and 8. In FIGS. 7 and 8, I and II are used to indicate the curves obtained with path PI and path PII respectively.

According to what is illustrated here below in further detail, the return portion 12 has a plurality of curvature portions R, each of which has a respective different curvature radius. The curvature portions R are portions of the side surface 10. Each curvature portion R acts as a local shoulder element for the portion of line F.

Each curvature portion R is substantially a portion of an osculating circle, which determines a corresponding curvature C of the line F. Each curvature portion R develops on a respective plane, has a respective curvature centre and is determined by a respective radius.

Advantageously, the curvature portions R can develop on different planes to one another.

The curvature portions R can overlap, at least partially at one same portion of the line F, or they can be in succession with one another, i.e. one after the other, in contact with one another, or spaced apart.

Advancing along the line F, starting from the groove 9 and reaching the end of the line F, it is possible to encounter a sequence of curvature portions R projected both on a plane π1, which is substantially perpendicular to the longitudinal axis X of the rotary head 1, and on a plane π2, which is substantially coplanar to the longitudinal axis X of the rotary head 1.

Figure 5:
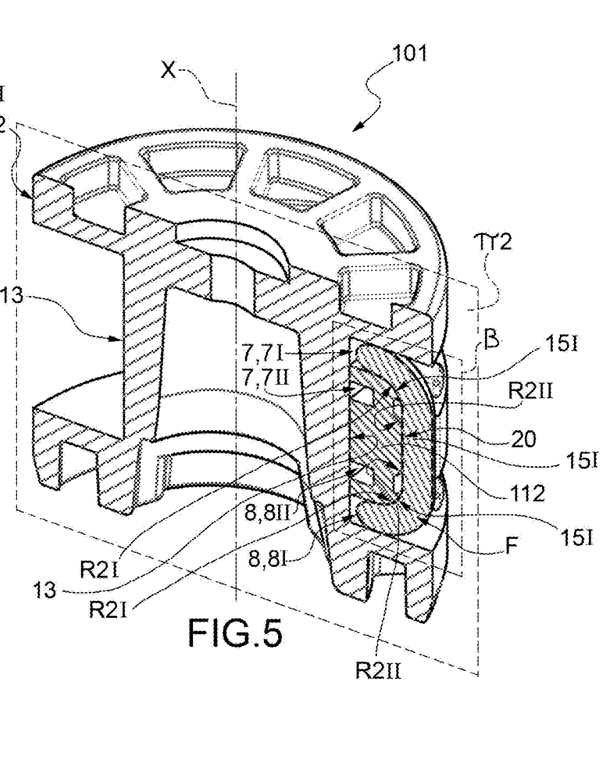
FIG. 5 is a section according to the plane $\pi 5$ in FIG. 2.
Figure 9:
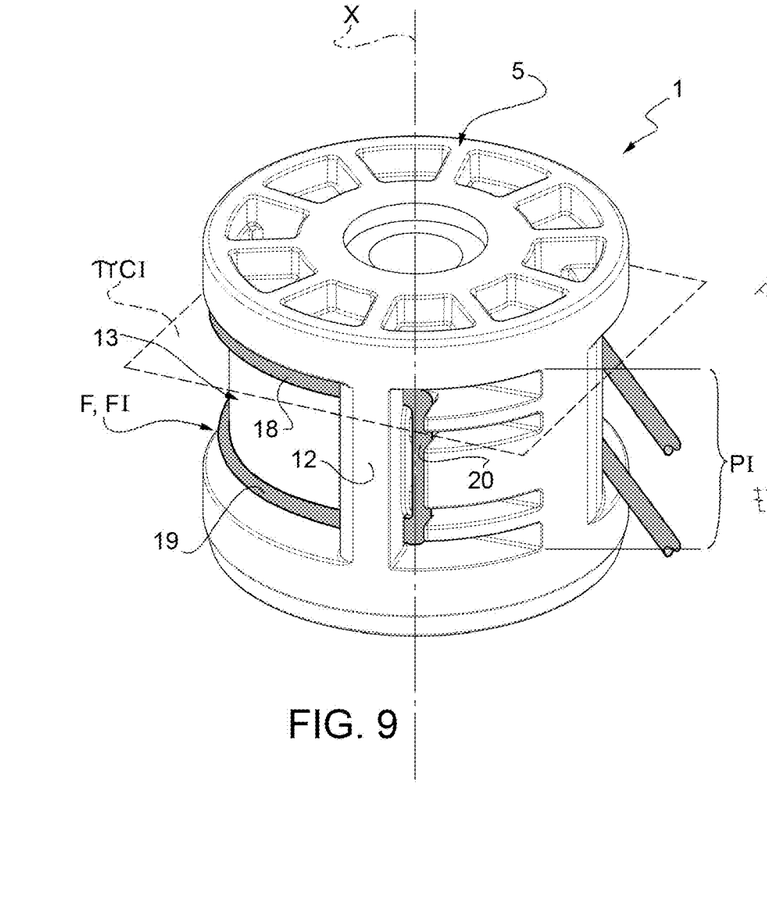
FIG. 9 depicts the rotary head in FIG. 1 in a first operating configuration.
Figure 10:
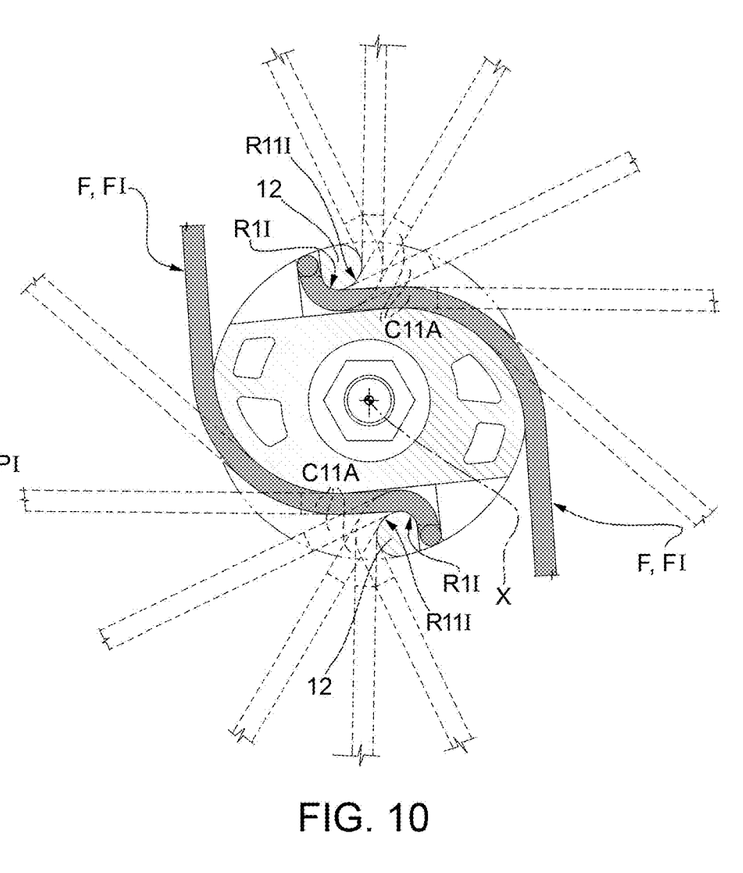
FIG. 10 is a section according to the plane $\pi CI$ in FIG. 9.

The curvature portions R along path PI are illustrated in detail in FIGS. 9, 10 and 5.

Figure 11:
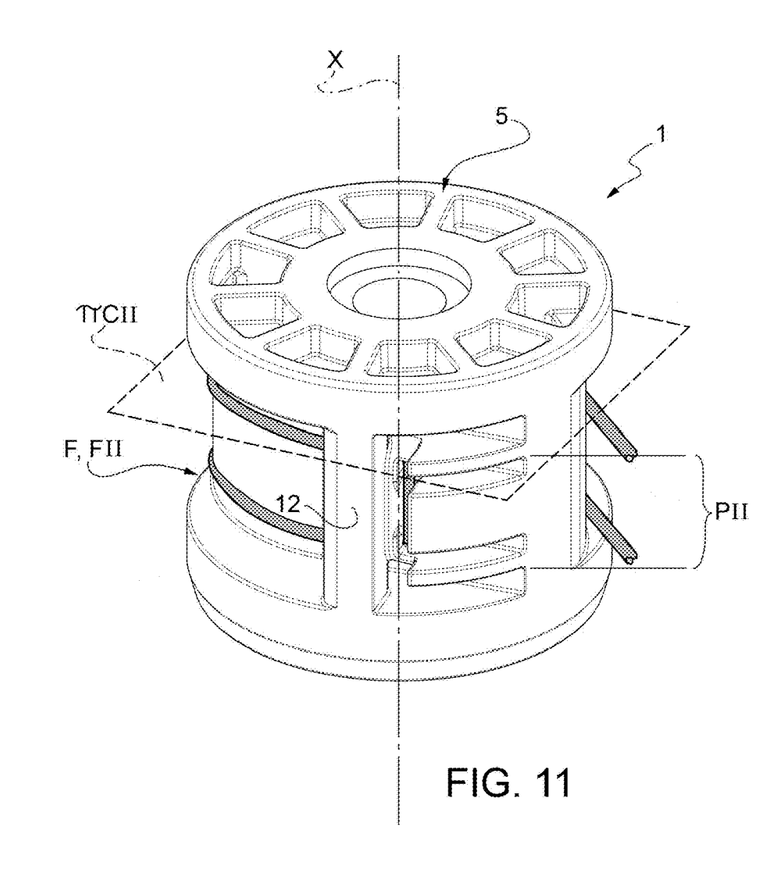
FIG. 11 depicts the rotary head in FIG. 1 in a second operating configuration.
Figure 12:
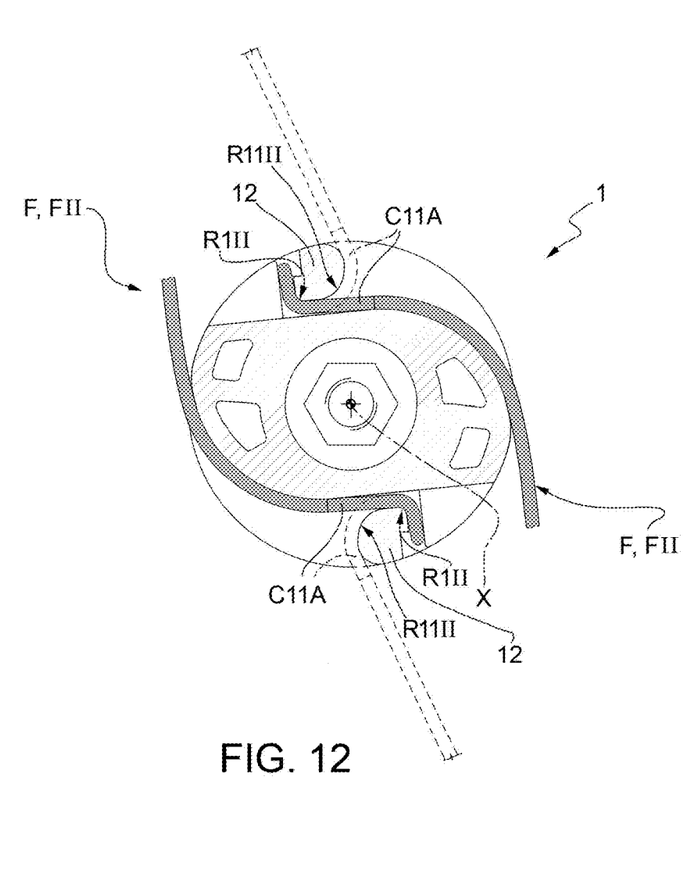
FIG. 12 is a section according to the plane $\pi CII$ in FIG. 11.

The curvature portions R along path PII are illustrated in detail in FIGS. 11, 12 and 5.

The sequence of curvature portions R along path PI is described here below in further detail.

According to the illustration in FIG. 10, the return portion 12 has a curvature portion R1I for creating the curve C1AI. The curvature portion R1I develops on a plane (in this particular case, on the plane π1AI), which is substantially perpendicular to the longitudinal axis X of the rotary head 1. The curvature portion R1I has a radius from 3 to 4 mm, preferably 3.5 mm.

The same curvature portion R1I serves to create the curve C1B at a different position along the longtudinal axis X (in this particular case, at the plane π1BI in FIG. 7).

According to the illustration in FIG. 10, the return portion. 12 has a curvature portion R11I (for creating the curve C11A when the line F is bent, in use, at least, partially about the return portion 12.

The curvature portion R11I has a radius from 6 to 7 mm, preferably 6.5 mm.

The same curvature portion R11I serves to create the curve C11B at a different position along the longitudinal axis X (in this particular case, at the plane π1BI in FIG. 7).

Advantageously, the return portion 12 has a curvature portion R2I (schematised in FIG. 7) for creating the curve C2AI. The curvature portion R2I develops on a plane (in this particular case, on the plane π2), which is substantially coplanar and radial to the longitudinal axis X of the rotary head 1. The curvature portion R2I has a radius from 4 to 6 mm, preferably 5 mm.

As described above, the sequence of curvature portions R along path PII is described here below in further detail, with particular reference to FIGS. 11 and 12.

According to the illustration in FIG. 12, the return portion 12 has a curvature portion R1II for creating the curve C1AII. The curvature portion R1II develops on a plane (in this particular case, on the plane π1AII), which is substantially perpendicular to the longitudinal axis X of the rotary head 1. The curvature portion. R1II has a radius from 1 to 3 mm, preferably 2 mm.

The same curvature portion R1II serves to create the curve C1BII at a different position along the longitudinal axis X (in this particular case, the plane π1BII in FIG. 7).

According to the illustration in FIG. 12, the return. Portion 12 has a curvature portion R11II (for creating the curve C11AII when the line F is bent, in use, at least Partially about the return portion 12.

The curvature portion R11II has a radius from 6 to mm, preferably 6.5 mm.

The same curvature portion R11II serves to create the curve C11BII at a different position along the longitudinal axis X (in this particular case, at the plane π1BI in FIG. 7).

The curvature portions R11I and R11II can substantially be equal to each other, as described and illustrated herein, or they can be different from each other.

Advantageously, the return portion 12 has a curvature portion R2II (schematised in FIG. 7) for creating the curve C2AII. The curvature portion R2II develops on a plane (in this particular case, on the plane π2), which is substantially coplanar and radial to the longitudinal axis X of the rotary head 1. The curvature portion R2II has a radius from 1 to 3 mm, preferably 2 mm.

The curvature portions described above are also to be understood as present in the rotary head. 101 with the return element 112 and they are not repeated and shown again for brevity's sake. Thus, in the figures relating to the rotary head 101, the same references are reported to denote the same curvature portions R.

Advantageously, the curvature portion R11I (for path PI) or the curvature portion R11II has a radius K resulting from the following equation.

$$K = \frac{\frac{De}{2} + s + df + 1}{2}$$

Wherein:

De is the outer diameter of the rotary head;

s is the size needed to ensure the fixing of the rotary head, usually obtained by means of a fixing hexagon coaxial to the longitudinal axis X;

df is the diameter of the line F.

Advantageously, if the radius K of the curvature portion R11I or R11II corresponds to the equation reported above, a smaller yield strength of the line F is obtained in use.

The succession of curves C1, C2, C11 described above is also comprised for the rotary head 1 shown in FIG. 1 and described previously.

Advantageously, the presence of the curves C11A, C11B wits a curvature radius K greater than 6 mm prevents the line F from deforming, i.e. becoming worn. In other words, edges or bumps are absent at the area, in which the line F is subject to stress, causing oscillations thereof (shown by the dotted line in 10 and 13), which, on coming into contact with the line F, could cause the breakage thereof. In particular, the sharp edges close to the oscillation area of the line F are completely eliminated.

Advantageously, the ends of the line portion F are pulled, so as to trap the connection portion 20 inside the respective groove 9. In particular, the portion of line F is kept fixed inside the groove 9 by the respective wall 15 with an angle of less than 90° with respect to the wall 13. According to one variant, which is not shown, the portion of line F can be pulled until it has only one single portion 18 or 19, which protrudes from the rotary head 1 or 101. Advantageously, in this way, it is possible to vary the number of portions, protruding from the rotary head 1 or 101, in use. For example, two or four portions of line F can protrude from the rotary head 1 or 101.

Advantageously, the presence of the recess 11 allows the line F to stay protected and partially supported in use. In fact, during a normal use of the rotary head 1 or 101 of the type described above, only the portion of line F, which protrudes longitudinally from the recess 11, becomes worn. In this way, it is ensured that the line F remains intact for the portions 18 and 19, which are contained inside the recess 11. This gives a portion of line F, which is long enough to be unthreaded. Advantageously, during the removing of the line F, an operator must overcome the forces opposing the curves C1A and C1B, given that, at the time of removing the line F, the curves C2 don't oppose such operation, i.e. they don't apply any resistance. Therefore, the operator is able to remove a line F for the replacement thereof, with little effort and no tools.

Advantageously, the sequence of curvature portions R described above allows the line F to be kept fastened to the rotary head 1 or 101.

The invention claimed is:

1. A rotary head for a string trimmer that is configured to cut with a cutting line, the rotary head comprising:
 a rotary body comprising a rotation axis and a side wall wherein the rotary body is manufactured as one single piece wherein the rotary body has at least one return area or means that is configured to accommodate, in use, a portion of the cutting line and cause the portion of the cutting line to bend and form a plurality of curved portions such that consecutive ones of the curved portions lie on different planes so as to lock said portion of said cutting line;
 wherein the at least one return area or means is arranged along the side wall of the rotary body wherein said side wall is parallel to the rotation axis, and wherein, in use, the portion of the cutting line inserted in the at least one return area or means does not protrude outwards from the rotary body.

2. The rotary head according to claim 1, wherein at least two of the consecutive ones of the curved portions of the cutting line lie on planes that are perpendicular to each other.

3. The rotary head according to claim 1, wherein the at least one return area or means comprises at least one path, wherein the at least one path is configured to bend the portion of the cutting line, wherein the at least one path has a pair of channels that, are substantially transverse to said rotation axis and a groove, that is substantially parallel to said rotation axis and wherein said pair of channels are connected to each other by said groove.

4. The rotary head according to claim 3, wherein the at least one path comprises a first outer path and a second inner path, wherein the second inner path is arranged inside the first outer path.

5. The rotary head according to claim 4, wherein the first outer path and the second inner path share the groove, wherein the pair of channels of the first outer path comprises a first upper channel and a first lower channel, and wherein the pair of channels of the second inner path comprises a second upper channel and a second lower channel of the that are interposed along the groove between the first upper channel and the first lower channel of the first outer path.

6. The rotary head according to claim 4, wherein said first outer path further comprises a first curvature portion having a radius ranging from 3 to 4 mm, and wherein said rotary head has a second curvature portion having a radius ranging from 4 to 6 mm.

7. The rotary head according to claim 4, wherein said second inner path further comprises a first curvature portion having a radius ranging from 1 to 3 mm, and wherein said rotary head has a second curvature portion having a radius ranging from 1 to 3 mm.

8. The rotary head according to claim 4, wherein the at least one return area or means further comprises a curvature portion having a radius resulting from the following equation:

$$K = \frac{\frac{De}{2} + s + df + 1}{2}$$

wherein:
De is an outer diameter of the rotary head;
s is a size of a fixing means arranged coaxial to said rotation axis; and
df is a diameter of the cutting line.

9. The rotary head according to claim 1, wherein, for the at least one return area or means, the rotary body has at least one recess made in the side wall of the rotary body wherein the at least one recess radially communicates with an outside of said rotary body wherein, the at least one return area or means is arranged inside the at least one recess wherein, the at least one return area or means comprises at least one path comprising a pair of channels and a groove.

10. The rotary head according to claim 9 further comprising a plurality of boards, each of the plurality of boards protrudes crosswise to the rotation axis into the at least one recess towards a return portion of the at least one return area or means wherein each of the plurality of boards laterally delimits one of the channels of the pair of channels, wherein said groove is interposed between the return portion of the at least one return area or means and the plurality of boards; wherein each of the plurality of boards is radially delimited by a side striking surface facing the return portion, the side striking surface being inclined so as to form an angle which is equal to or smaller than 90° relative to a bottom surface of the recess.

* * * * *